Figure 1:
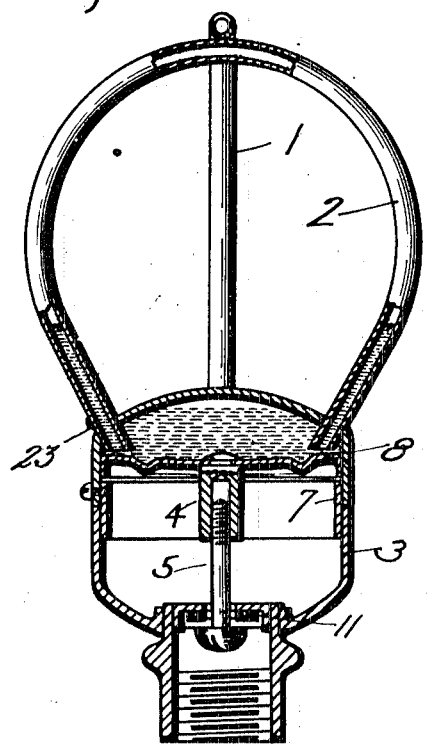

E. S. HALSEY.
SAFETY AUTOMATIC VALVE FOR GAS BURNERS.
APPLICATION FILED MAY 16, 1911.

1,096,836.

Patented May 19, 1914.

3 SHEETS—SHEET 1.

Witnesses:
Frank J Hattie
S. C. Halsey.

Inventor,
Edward S. Halsey

E. S. HALSEY.
SAFETY AUTOMATIC VALVE FOR GAS BURNERS.
APPLICATION FILED MAY 16, 1911.
1,096,836.
Patented May 19, 1914.
3 SHEETS—SHEET 3.
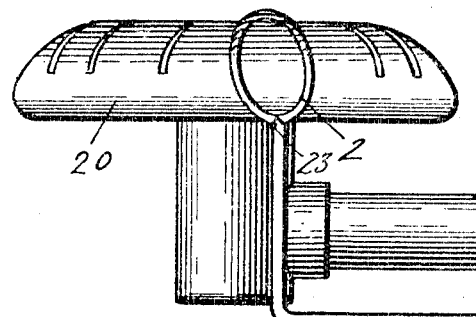
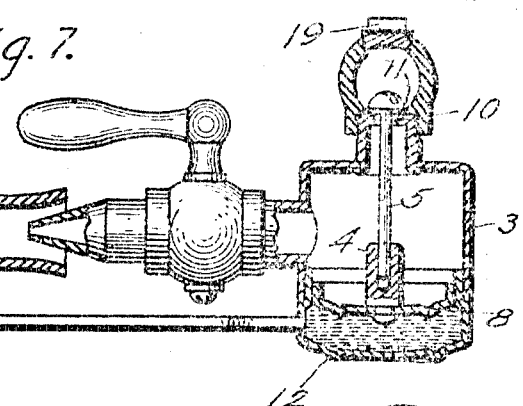
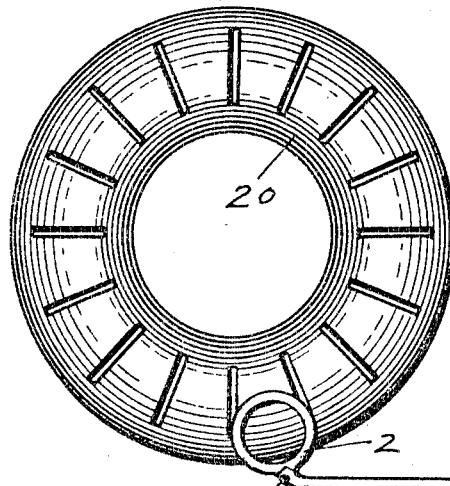
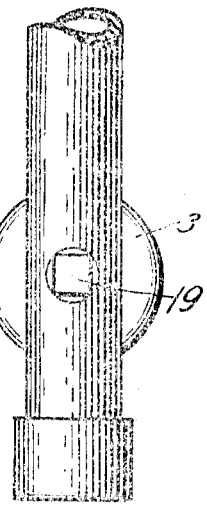
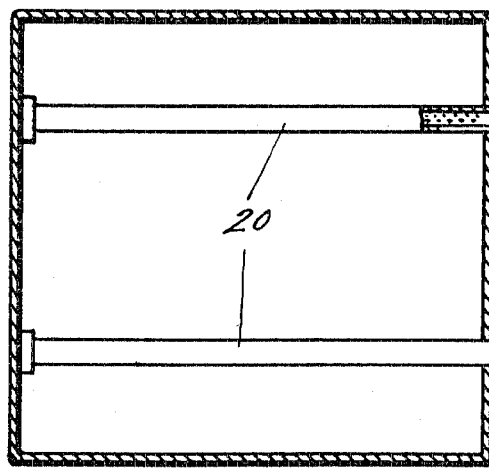
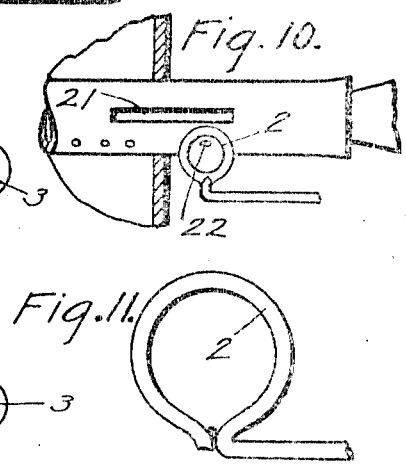
Witnesses:
Frank G. Hattie
S. C. Halsey.
Inventor,
Edward S. Halsey

UNITED STATES PATENT OFFICE.

EDWARD S. HALSEY, OF LYNN, MASSACHUSETTS, ASSIGNOR TO AMERICAN GAS LIGHT COMPANY OF NEW ENGLAND, OF BOSTON, MASSACHUSETTS, A CORPORATION OF MASSACHUSETTS.

SAFETY AUTOMATIC VALVE FOR GAS-BURNERS.

1,096,836.  Specification of Letters Patent.  Patented May 19, 1914.

Application filed May 16, 1911. Serial No. 627,505.

*To all whom it may concern:*

Be it known that I, EDWARD S. HALSEY, a citizen of the United States, residing at Lynn, in the county of Essex, in the State of Massachusetts, have invented certain new and useful Improvements in Safety Automatic Valves for Gas-Burners, of which the following is a specification.

My device is a thermally operated valve in conjunction with gas or gasolene burners of all kinds, arranged to cut off the gas supply in case the flame is extinguished from any accidental cause. Also to reëstablish the gas flow and maintain it by means of the application of heat to a sealed thermostatic tube at the burner, which communicates the pressure of gas generated from a volatile liquid within the tube to an actuating diaphragm.

The objects of my invention are, to construct an exceedingly simple, positive and sensitive mechanism which acts very quickly to open the valve upon the application of heat to the tube and is likewise prompt to close it upon the discontinuance of heat.

A further object is to construct a mechanism permitting of very wide range of temperature variation; without destructive effects on one hand or without the premature closing of the valve on the other hand when the thermostatic tube is only subjected to a minute pilot flame or low turned burner.

Referring to the drawings which illustrate my invention, similar numerals or letters refer to similar parts throughout the several views, in which—

Figure 2:
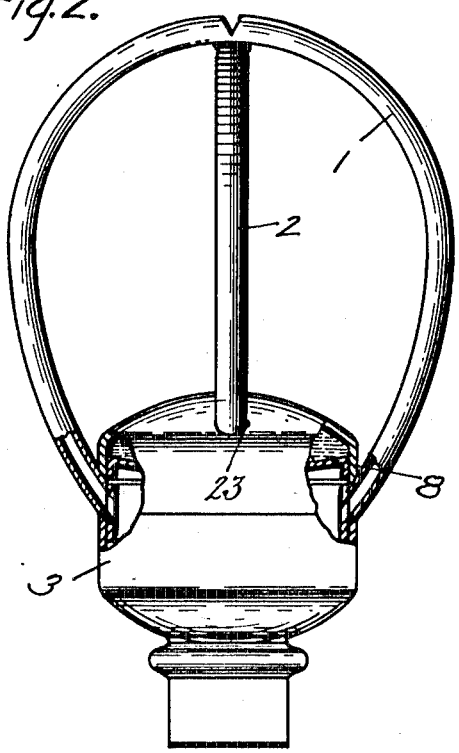
Figure 3:
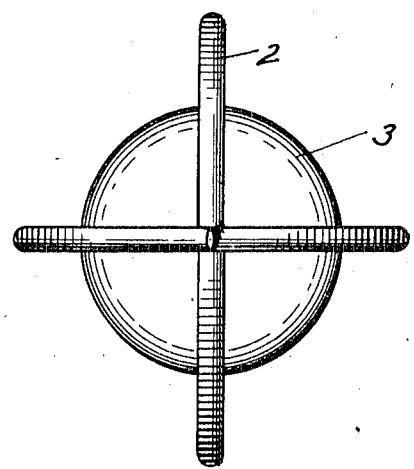
Figure 4:
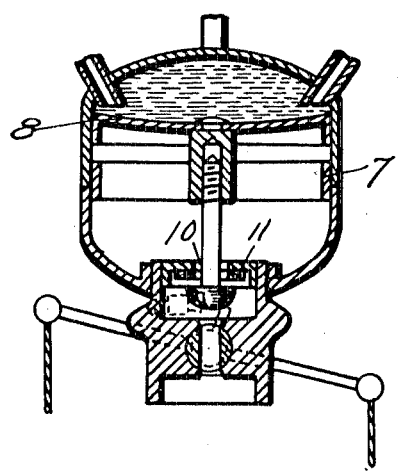
Figure 5:
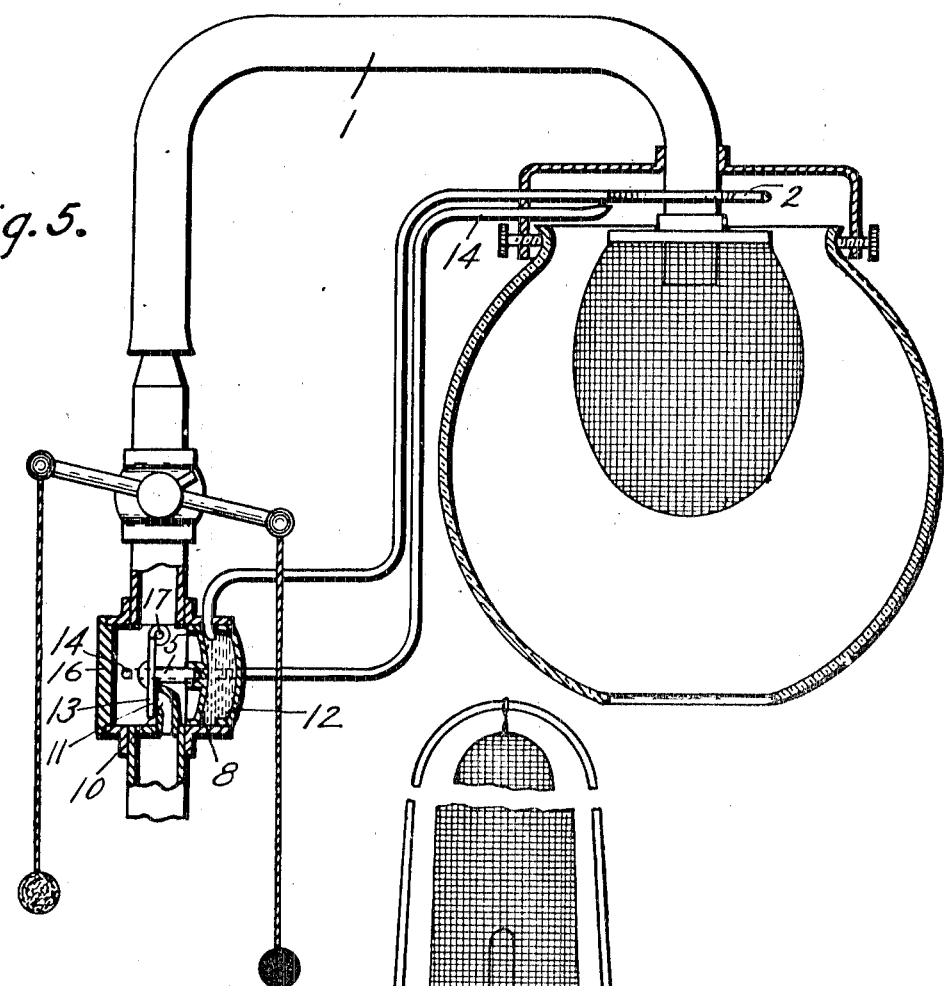
Figure 6:
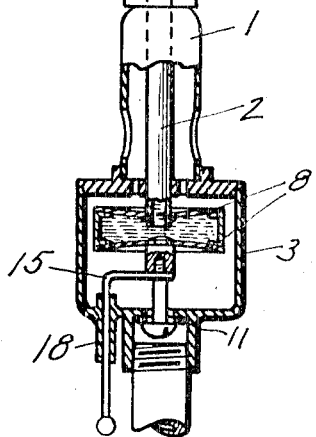

Figure 1 is a side elevation in partial cross section, Fig. 2. a front elevation and Fig. 3. a plan view of one of my open burners, while Fig. 4. is a vertical cross section of the same class of burner with turn down valve and the burner and thermostatic tubes broken away. Fig. 5. is the side elevation of my burner applied to inverted mantle with pilot tube and turn down attachments. Fig. 6. is the side elevation of a vertical mantle burner with a hand pull attachment for opening the valve when lighting the burner. Fig. 7. is a side elevation of my safety valve, shown attached to a single burner of a common gas stove, while Fig. 8. is a plan view of the same. Fig. 9. is a plan view of a range oven equipped with twin burners and automatic safety valves, while Fig. 10. is a front elevation showing a part of one of the burner tubes at its intersection with the oven wall, and also showing the lighting slot and thermostatic tube on the outside of the wall. Fig. 11. is the thermal extremity of one of the thermostatic tubes of alternative formation from that of the other tubes on the same sheet.

In applying my invention to open burners, shown most particularly in Figs., 1., 2. and 3., the body of the burner is a short cylinder in form, joined in the center by an inner slip flange ring, 7., while the upper end of the cylinder is made into an expansion chamber by soldering into it the flanged, flexible diaphragm, 8. The thermostatic tube 2., in the form of a wicket, penetrates this chamber by both extremities which pass to the lower part of the chamber and are soldered into the outer shell. The burner tube, 1., also of wicket formation, enters the body of the burner below the diaphragm at points diametrically opposite to each other and arches over and crosses the thermostatic tube at its center, at which point the two tubes are soldered together with the object of conducting the heat of the steel burner tube to the brass thermostatic tubes which on account of its relatively high heat conductivity more rapidly distributes and applies it to the effective surface, thereby securing a maximum effect from a minimum of heat.

Several advantages are obtained by the loop or horse shoe construction of the thermostatic tube, one being that the points where the tube is sealed by solder are remote from the point of highest temperature, another is, that as the tube is essentially a very small and light capillary tube, it would be very difficult to fill with liquid if both ends were not open, and equally difficult to braze the one extremity of the tube to seal it while filled with liquid. Still another decided advantage of the arch construction is to facilitate the instantaneous heating of the tube by holding the flame of a match within and beneath the overhanging arch.

The flanged, metallic diaphragm is soldered into the upper portion of the cylindrical body, 3, partitioning off the expansion chamber. This chamber and intercommunicating thermostatic tube, 2, are preferably entirely filled with the volatile liquid employed, but as it is difficult to get out the last few bubbles of air which would destroy the efficiency of the device if they displaced the liquid from the capillary tube, I overcome the difficulty by extending the extremities of the tube, inward and downward so that any remnant of air remaining in the expansion chamber will be trapped, rising to the highest point and be prevented from entering the tube.

The bottom of the burner body, 3, has a threaded neck for connecting with the gas pipe with an intercommunicating gas inlet, 10, the under side of which forms the valve seat, while the screw, 5, acts as the valve, its head being equipped with a leather washer cemented to it, closing the opening. This screw is adjustably mounted in the threaded socket, 4, attached to the diaphragm, 8, so that after the burner is assembled this valve screw can be introduced through the neck and gas inlet and adjusted in its socket so that the head is just seated when the burner is in the cooled or closed position as shown in Fig. 7.

Figs. 1, 2, and 4, show the diaphragm and valve in the expanded or open position, which is secured by applying heat to the thermostatic tube. This heat instantly volatilizes a portion of the liquid in the upper part of the tube, driving the bulk of the liquid out of the tube into the expansion chamber, thereby depressing the diaphragm and the valve from its seat. The closed position is again restored as soon as the tube is allowed to cool, thereby establishing a partial vacuum and sucking the diaphragm to the upward arching position again. In this position it is held firmly, partly by the upward bowed, or trussed position of the diaphragm, and partly by the surface pressure thereon.

After considerable experimenting, I have succeeded in giving this burner so wide a range of flame without liability of over strain with a maximum flame and heat, and without liability to shut off prematurely, with a minimum flame, that it may be operated continuously, either with a flame one eighth of an inch high or with a full flame of six to eight cubic feet per hour. I accomplish this freedom from strain by increased heat, by arranging the thermal tube in a vertical plane and so proportioning the containing capacity of its heated portion to the capacity of diaphragm expansion, that the liquid is allowed to descend from the hot portion of the tube by the distention of the diaphragm, resultant from a very moderate application of heat and pressure, so that the center of the loop may be heated many times hotter without materially affecting the pressure as the tube is filled with vapor only. I have contrived to keep the diaphragm and valve in the depressed open position by so constructing the diaphragm with regard to its form and elasticity that it is non-restorative as to position, always remaining bowed down or up, until an excess of fluid pressure has accumulated on one side or the other to force it past its middle position. When so constructed, the burner will remain in the open position while a vestige of artificial heat is applied to the burner but will close within a second or two after the flame is extinguished.

By forming the diaphragm in a die throwing back a flange with a rounding corner, the life and elasticity of the diaphragm are materially increased and the rigid mounting of the diaphragm is facilitated, and the liability of the solder running on to the flexible portion or working loose is very much reduced.

I make a cheap, convenient and effective joint between the two halves of the housing, 3., by forming the slip flange, 7, slightly larger than the thin outer shell, so that in forcing it within the shell, the latter is expanded to the limit of its elasticity, thus making a perfectly gas tight joint which may be retained against pulling apart by two small pins or screws driven through the shell.

Referring to Fig. 5., which illustrates the application of my invention to inverted mantle burners, it will be noted that the valve mechanism is arranged directly above the gas supply. Between this automatic valve and the Bunsen tube is rigged a lever valve with pull chain to turn on and off the light. From the expansion chamber, formed between diaphragms 8., and 12., the thermal tube leads upward and enters the brass hood over the top edge of the globe and terminates in a closed tubular ring encircling the burner. A small pilot light tube leads from the valve chamber to the burner hood, directly beneath the thermal tube so that when the light is extinguished by means of the pull chain, a minute pilot flame burns continuously within the hood, playing upon the under side of the thermal tube, thereby keeping the automatic valve open so that by simply turning on the gas by means of the lighting chain, illumination is immediately established. On the other hand, if the pilot flame becomes extinguished from interruption of the gas supply, the automatic valve promptly closes, and the flow can only be reëstablished by pressing upon the outer diaphragm, 12., which communicates the pressure to the inner diaphragm and valve, whereupon the light can be instantly lighted and the pressure can be removed from the outer diaphragm almost instantly as internal pressure is established by the flame striking the thermal tube. This diaphragm, 12., unlike the inner diaphragm, is made self restoring, always assuming the convex position, like an oil can bottom, except when under pressure of the thumb. It should be understood that this valve chamber, as illustrated in Fig. 5., is a horizontal cylinder shown in longitudinal cross section in which the outer diaphragm, 12., forms one of the circular heads and the removable plate, 16., the other. This latter is applied with a driving fit making it gas tight and may be removed to secure access to the valve, 13., which is hinged at 17., and covers the inlet port, 10., formed by a bent tube. The face of the valve is covered with thin leather to make a tight joint and is connected to the actuating diaphragm, 8., by the screw 5., by means of which it is adjusted to its seat.

Fig. 6., illustrates the application of my invention to straight mantles. In this figure the expansion chamber is formed of two concave diaphragms joined together at their peripheries and carried by being concentrically mounted upon the lower end of the thermostatic tube, 2., which penetrates the upper diaphragm and extends to the center of the chamber and is soldered internally to it. The thermal tube is supported by being forced through the top plate of the housing, 3., and passes concentrically up through the Bunsen burner tube, 1., through the davie screen into the lower portion of the combustion chamber. The upper end of the tube being sealed by fusion of its walls so that it may withstand the high temperature of the flame. I illustrate in this figure another means of manually opening the automatic valve for instantaneously lighting which consists simply of a bent connecting rod passing up through a close fitting tube, 18., and connecting to the valve stem by a tapped hole through its inner extremity. The outer extremity of this rod may be equipped with a pull chain and acorn.

Referring to Figs., 7., 8., 9., and 10., which illustrate the application of my invention to gas stoves, it will be noted that the valve housing, 3., is in the form of a short cylinder with a threaded neck and entrance port at the top adapted to be screwed into the under side of the trunk supply pipe and that there is a plugged tapped hole directly above each gas port to provide means of adjusting the valve screw to its seat by removing plug, 19. As is obvious, this screw which is threaded into a socket, 4., fixed to the center of diaphragm, 8., acts as valve and stem and its head is made to seat gas tight against the upper face of the orifice, 10., by the intervention of a leather washer between the contact surfaces, which washer may be cemented either to the valve seat or to the screw head itself which acts as the valve disk, preferably to the latter. It will be noted in this application of the device that the expansion chamber is formed between two flexible diaphragms, 8., and 12., and that the outer diaphragm is a unit with the cylindrical walls of the expansion chamber which is a shell drawn up out of thin spring metal with flanged diaphragm, 12., forced and soldered within it, and that the flange of the shell itself is forced within the main cylinder, 3. The diaphragm, 12., is formed to be self restoring as to its position and simply acts as a manual means of opening the valve as in Fig. 5., while diaphragm, 8., is adjusted with its spring tension so that it will remain either concave or convex when so thrown until considerable pressure has accumulated to reverse it. The out going gas port in the mechanism, as illustrated on this sheet, leads from one side of the housing cylinder and is controlled by an ordinary lever gas cock which delivers the pressure in a concentrated jet into the orifice of the Bunsen or mixing tube as is usual. Figs., 7., and 8., illustrate the application of a ring burner, while Figs., 9. and 10., illustrate long tubular burners drilled on the under side as is common in gas oven work. Fig. 10., is an enlarged side elevation, in fraction, showing the oven wall cross section and the burner tube's intersection therewith, and showing the lighting slot, 21., leading from outside the oven to the inside, also a small drilled hole, 22., for a pilot flame just outside the oven intended to play upon the center of the upper portion of the loop of the thermal tube, 2., which tube leads directly to the expansion chamber. In order to light one of these oven burners, a kindled match may be thrust through the thermal loop, which is of very light cross section and thin walled, which consequently is heated through to the point of volatilization at its over arching section almost instantly, establishing a pressure on and dilation of diaphragm, 8., thus opening the gas port, whereupon the pilot flame and oven lighting slot are promptly lighted and consequently the interior of the oven itself. Just so long as the flame in the lighting slot or the pilot flame continues to play upon the thermal tube, no matter if turned to the lowest operating point, sufficient internal stress will be preserved within the expansion chamber to prevent the exterior atmospheric pressure from forcing in the diaphragm and cutting off the supply, but within two or three seconds after the flame becomes extinguished for any reason, the sensitive thermal tube on account of its disposition outside the storage influence of the oven and its exposure to free circulation of cool air, will condense the liquid vapor within it, abstracting liquid from beneath the diaphragm and cause it to cut off the supply. It is not essential that the pilot flame, 22., be separate from the lighting slot, as the latter may perform both functions if the top of the tube is arranged so that the flame from the slot can play upon it.

A decided advantage in a gas stove or oven having multiple burners, each burner equipped with one of these safety valves, is that if one burner becomes extinguished or accidentally turned on and not lighted, while another burner is lighted, no free gas can accumulate and cause an explosion.

As I construct my mechanism it is especially adapted for use with gas heated appliances such as stoves, water heaters and mantle burners where the thermal effect is necessarily well removed from the valve mechanism on account of the intervening mixing tube and large quantity of heat generated, as by means of a small pressure tube the energy developed within the sensitive thermal loop, 2., can very advantageously be communicated to the distant pressure chamber. The thermal terminal, or loop, 2., is constructed so sensitive, by being made of very light silver or copper tube of high conductivity, about one sixteenth of an inch in diameter, and with the walls from seven to ten thousandths inch in thickness, that it is only necessary for it to intersect the flame at its edge, and so close to the burner that the flame contact is nearly as great when turned low as when on full. On account of the high conductivity of the metal of which the tube is formed, the high temperature of the limited flame contact is distributed throughout the tube, obviating a destructive temperature at the point of contact.

While I prefer to construct the tube leading from the thermal loop to the expansion chamber of heavy copper or brass for mechanical strength and to dissipate the heat absorbed from the thermal loop and keep the temperature of the soldered vent and joint at the junction of the two well below the fusing point of solder, I show an alternative construction, in Fig. 11., whereby the thermal loop may be simply a loop bent from the end of the tube leading to the expansion chamber without intermediate joint. In which case the opening in the end of the tube acts as a filling vent which is sealed by solder after it is filled and its extremity is also soldered to the tube proper, completing the loop and equalizing the distribution of heat in the loop. I sometimes construct the loop in this way of the light sensitive tubing and join it to the end of the heavier tubing to convey the pressure and dissipate the heat.

To eliminate any possible danger of fire in case the volatile liquid should leak, or apprehension of danger of same, it is very desirable that the volatile liquid employed should be non-inflammable. At the same time it should be quite volatile and sensitive to heat, but its boiling point should be fifty or sixty degrees above the temperature of the atmosphere. It should likewise be a liquid difficult to freeze.

I find the carbon chlorids, (boiling at from 140° to 170°, F.), eminently suited for this purpose, at the same time any other non-inflammable volatile liquid of suitable boiling point may be used.

The form of gas burner which I have developed and shown in Figs. 1., 2. and 3., possesses superior merit over common gas burners as it throws a reliable, uniform, brilliant flame of good form crosswise of the tube, resultant from the impact of the two ascending jets.

The following claims set forth, what I believe to be new and useful improvements.

I claim:—

1. In an automatic thermostatic gas burner mechanism, a valve manipulating expansion chamber; a sealed thermostatic tube in communication with said chamber, said tube being constructed in the form of an arch or loop so arranged and formed of sufficiently large dimensions to facilitate the free burning and heating of a match or kindling flame within and beneath its arch, substantially as shown and for the purpose specified.

2. In a thermostatic gas burner a housing body; a horse-shoe burner tube, with extremities entering said body and having a gas jet opening at its center and a thermostatic tube, leading from said body and joining said burner tube at its center beneath said gas jet for the purpose specified.

3. In a thermostatic gas burner a body; a horse-shoe burner tube, rising in the form of a wicket from said body and a wicket thermostatic tube rising in like manner from said body and crossing said burner tube at right angles, the two tubes joining and bracing each other at their centers substantially as shown.

4. In a thermostatic safety gas burner a housing body; a sealed metal diaphragm partitioning off an expansion chamber in one end of said housing; a gas tube leading from the body cavity below said diaphragm to the jet orifice; a sealed thermostatic tube leading from the expansion chamber above said diaphragm into such proximity to said orifice as to be heated by the igniting flame, a port admitting gas to said cavity opposite to the expansion chamber and a valve controlling said port and connected to said diaphragm.

5. In a thermostatic safety gas valve mechanism an outer casing; a sealed metallic expansion chamber in one end of said casing, one wall of which is formed by a flexible diaphragm; a sealed external tube communicating at both ends with said chamber; a suitable volatile liquid filling said tube and chamber and adapted to flex said diaphragm by the volatilization of a portion thereof; a gas port, an external closing valve in the opposite end of said casing from the expansion chamber and concentric with it; and a suitable valve stem concentric and perpendicularly mounted to said diaphragm, whereby when the latter expands the valve stem is pushed outward to the gas port removing said closing disk from its seat.

6. In a thermostatic safety gas burner a valve actuating expansion chamber and a sealed thermal tube extending therefrom; a volatile liquid filling for the said chamber and tube; a housing for said expansion chamber; a slender metal gas burner tube constructed with thin walls, light mass and of low conductivity so as to heat quickly at the flame orifice without conducting the heat freely to said housing; said thermal tube being of tubing substantially as light as the burner tube but of a metal of higher conductivity than the latter and being conductively united to it close to the point of heat generation for the purpose specified.

Having described my invention, I hereunto set my hand in the presence of two witnesses.

EDWARD S. HALSEY.

Witnesses:
FRANK G. HATTIE,
S. C. HALSEY.